US012801638B2

(12) United States Patent
Fang et al.

(10) Patent No.: US 12,801,638 B2
(45) Date of Patent: Nov. 17, 2026

(54) SYSTEMS AND METHODS FOR OPTIMAL LARGE LANGUAGE MODEL ENSEMBLE ATTRIBUTE EXTRACTION

(71) Applicant: Walmart Apollo, LLC, Bentonville, AR (US)

(72) Inventors: Chenhao Fang, San Jose, CA (US); Xiaohan Li, Sunnyvale, CA (US); Jianpeng Xu, Cupertino, CA (US); Kaushiki Nag, Sunnyvale, CA (US); Evren Korpeoglu, San Jose, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/030,684

(22) Filed: Jan. 17, 2025

(65) Prior Publication Data

US 2025/0245246 A1 Jul. 31, 2025

Related U.S. Application Data

(60) Provisional application No. 63/627,370, filed on Jan. 31, 2024.

(51) Int. Cl.
*G06F 16/00* (2019.01)
*G06F 16/23* (2019.01)
*G06F 16/28* (2019.01)

(52) U.S. Cl.
CPC ............ *G06F 16/287* (2019.01); *G06F 16/23* (2019.01)

(58) Field of Classification Search
CPC ............................... G06F 16/287; G06F 16/23
See application file for complete search history.

(56) References Cited

U.S. PATENT DOCUMENTS

| | | | | |
|---|---|---|---|---|
| 12,332,074 | B1 * | 6/2025 | Carbune | G06F 40/56 |
| 2022/0043864 | A1 * | 2/2022 | Mathew | G06N 5/04 |
| 2022/0343389 | A1 | 10/2022 | Kushkuley et al. | |
| 2023/0058829 | A1 | 2/2023 | Lin et al. | |
| 2023/0222561 | A1 * | 7/2023 | Schlaich | G06Q 30/0631 705/26.7 |
| 2024/0161017 | A1 * | 5/2024 | Pisner | G16H 50/20 |
| 2025/0238308 | A1 * | 7/2025 | Paulraj | G06F 11/0709 |

FOREIGN PATENT DOCUMENTS

CN 111523304 A 8/2020

OTHER PUBLICATIONS

C. Fang et al., "LLM-Ensemble: Optimal Large Language Model Ensemble Method for E-commerce Product Attribute Value Extraction," Jun. 20, 2024, 5 pages.

* cited by examiner

*Primary Examiner* — Dinku W Gebresenbet
(74) *Attorney, Agent, or Firm* — Morgan, Lewis & Bockius LLP; Manita Rawat

(57) ABSTRACT

This application relates to systems and methods of attribute extraction and labelling. In some examples, an input dataset is received and preliminary attribute labels are generated for an attribute of an element in the input dataset. Each of the preliminary attribute labels is generated by a large language model (LLM). An attribute label for the attribute is generated based on a weighted combination of the preliminary attribute labels for the attribute, and a data structure representative of the element is updated to include the attribute label for the attribute.

20 Claims, 6 Drawing Sheets

SYSTEMS AND METHODS FOR OPTIMAL LARGE LANGUAGE MODEL ENSEMBLE ATTRIBUTE EXTRACTION

CROSS-REFERENCE TO RELATED APPLICATIONS

This application claims benefit under 35 U.S.C. § 119 (e) to U.S. Provisional App. Ser. No. 63/627,370, filed Jan. 31, 2024, entitled "Systems And Methods For Optimal Large Language Model Ensemble Attribute Extraction," the disclosure of which is incorporated by reference herein in its entirety.

TECHNICAL FIELD

This application relates generally to attribute extractions of data elements, and more particularly, to attribute extraction using an ensemble of large language models.

BACKGROUND

Network environments utilize attributes extracted from data elements, such as data elements stored in network catalogs, for various network operations such as element selection, element recommendation, element grouping, etc. Although some current systems utilize extraction processes to extract attributes from catalog data, these systems require high quality datasets for both training and extraction in order to yield accurate attributes. Actual catalog datasets are often noisy and unstructured, resulting in incorrect attribute extraction or incorrect training of existing processes.

Large Language Models (LLMs) are very-deep learning generative models. LLMs are typically based on a transformer-based architecture that is configured to learn statistical relationships from a corpus, such as a corpus of text documents. Different LLMs can exhibit diverse strengths and weaknesses due to variations in data, architectures, and/or hyperparameters.

SUMMARY

In various embodiments, a system including a non-transitory memory and a processor communicatively coupled to the non-transitory memory is disclosed. The processor is configured to read a set of instructions to receive an input dataset and generate a plurality of preliminary attribute labels for at least a first attribute of a first element in the input dataset. Each preliminary attribute label in the plurality of preliminary attribute labels is generated by one of a plurality of large language models (LLM). The processor is further configured to read the set of instructions to generate a final attribute label for the first attribute based on a weighted combination of the plurality of preliminary attribute labels for the first attribute and update a data structure representative of the first element to include the final attribute label for the first attribute.

In various embodiments, a computer-implemented method is disclosed. The computer-implemented method includes steps of receiving an input dataset and generating a plurality of preliminary attribute labels for at least a first attribute of a first element in the input dataset. Each preliminary attribute label in the plurality of preliminary attribute labels is generated by one of a plurality of large language models (LLM). The computer-implemented method further includes steps of generating a final attribute label for the first attribute based on a weighted combination of the plurality of preliminary attribute labels for the first attribute and updating a data structure representative of the first element to include the final attribute label for the first attribute.

In various embodiments, a non-transitory computer readable medium having instructions stored thereon is disclosed. The instructions, when executed by at least one processor, cause at least one device to perform operations including receiving an input dataset and generating a plurality of preliminary attribute labels for at least a first attribute of a first element in the input dataset. Each preliminary attribute label in the plurality of preliminary attribute labels is generated by one of a plurality of large language models (LLM). The instructions further cause the at least one device to perform operations including generating a final attribute label for the first attribute based on a weighted combination of the plurality of preliminary attribute labels for the first attribute and updating a data structure representative of the first element to include the final attribute label for the first attribute.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
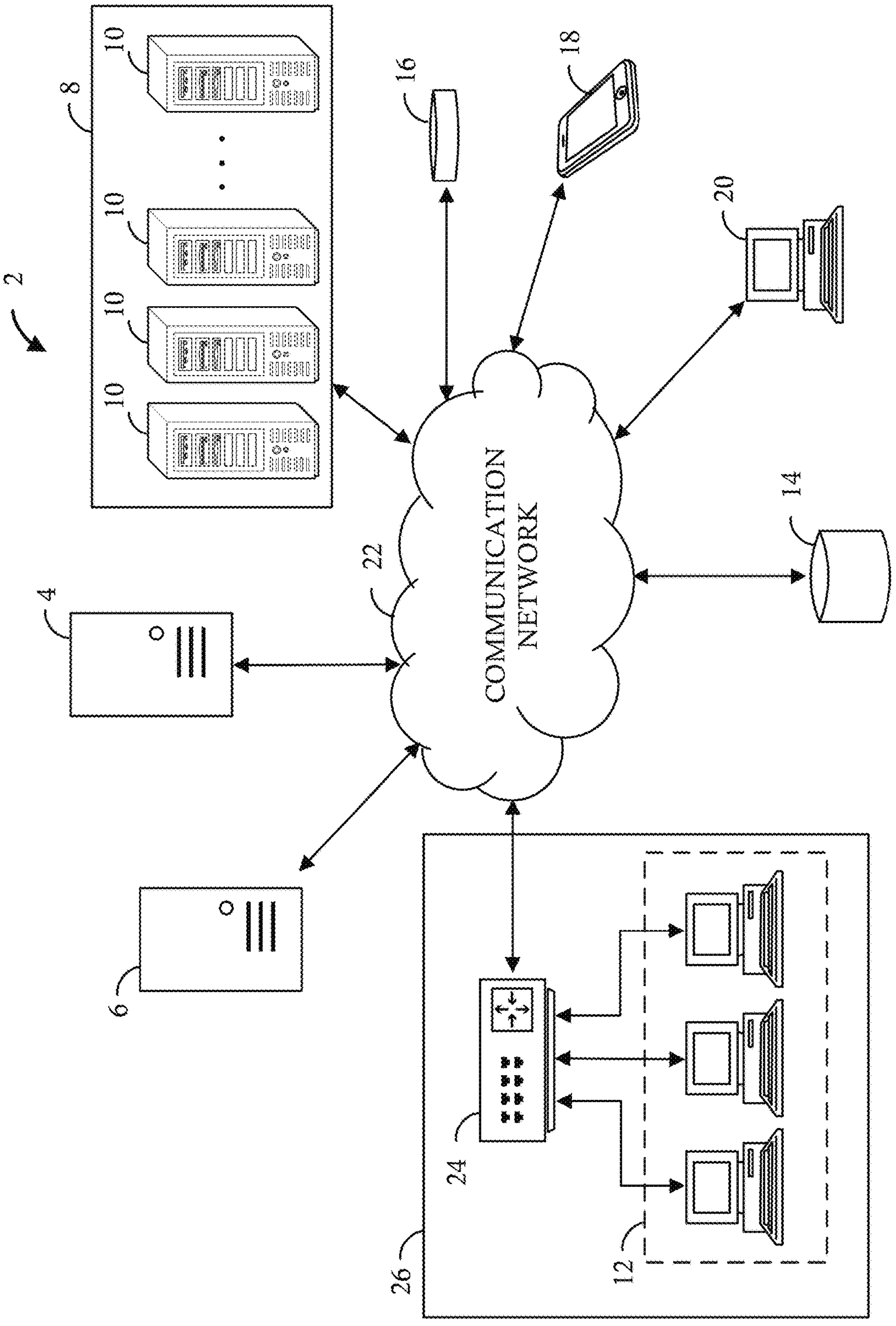
FIG. 1 illustrates a network environment configured to provide generation of LLM ensemble models and perform attribute extraction using LLM ensemble models, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for generation of LLM ensemble models and attribute extraction using LLM ensemble models. In various embodiments, one or more datasets including one or more potential attributes are identified and preprocessed for attribute extraction. Potential attributes may include data elements (e.g., text elements, image elements, metadata elements, etc.) that are descriptive of one or more features of a corresponding data element. The datasets may be cleaned and/or processed by one or more standard natural language processing (NLP) techniques and provided to an LLM ensemble model. The LLM ensemble model is configured to generate attribute labels for each of a plurality of LLMs within the ensemble model and apply a weighted combination to outputs of the plurality of LLMs to generate a final attribute label. The weights may be iteratively learned using any suitable model, such as a structured latent variable model, and applied in any suitable weighted combination, such as weighted majority voting. The output of the LLM ensemble model provides a theoretically optimal LLM attribute label that may be used in one or more additional processes, such as interface generation.

In some embodiments, systems, and methods for attribute extraction using LLM ensemble models includes one or more trained LLMs. The trained LLMs may include one or more LLMs, such as Alpaca, Flan-T5, GPT-3, GPT-3.5, GPT-4, LLAMA, LLAMA 2, MPT, OpenAssistant, PaLM, Pythia, Vicuna, etc. Although specific embodiments are discussed herein, it will be appreciated that any suitable LLM may be incorporated into an LLM ensemble model, as discussed in greater detail below.

In general, a trained function mimics cognitive functions that humans associate with other human minds. In particular, by training based on training data the trained function is able to adapt to new circumstances and to detect and extrapolate patterns. In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

FIG. 1 illustrates a network environment 2 configured to provide generation of LLM ensemble models and perform attribute extraction using LLM ensemble models, in accordance with some embodiments. The network environment 2 includes a plurality of devices or systems configured to communicate over one or more network channels, illustrated as a network cloud 22. For example, in various embodiments, the network environment 2 may include, but is not limited to, an attribute extraction computing device 4, a web server 6, a cloud-based engine 8 including one or more processing devices 10, a database 14, and/or one or more user computing devices 16, 18, 20 operatively coupled over the network 22. The attribute extraction computing device 4, the web server 6, the processing device(s) 10, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the attribute extraction computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the attribute extraction computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the attribute extraction computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the attribute extraction computing device 4, for example. The workstation(s) 12 may communicate with the attribute extraction computing device 4 over the communication network 22. The workstation(s) 12 may send data to, and receive data from, the attribute extraction computing device 4. For example, the workstation(s) 12 may transmit data related to tracked operations performed at the physical location 26 to attribute extraction computing device 4.

Although FIG. 1 illustrates three user computing devices 16, 18, 20, the network environment 2 may include any number of user computing devices 16, 18, 20. Similarly, the network environment 2 may include any number of the attribute extraction computing device 4, the web server 6, the processing devices 10, the workstation(s) 12, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the attribute extraction computing device 4, the web server 6, the workstation(s) 12, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16, 18, 20 may communicate with the web server 6 over the communication network 22. For example, each of the user computing devices 16, 18, 20 may be operable to view, access, and interact with a website, such as an e-commerce website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user may, via the web browser, perform various operations such as searching one or more databases or catalogs associated with the displayed website, view item data for elements associated with and displayed on the website, and click on interface elements presented via the website, for example, in the search results. The website may capture these activities as user session data, and transmit the user session data to the attribute extraction computing device 4 over the communication network 22. The website may also allow the user to interact with one or more of interface elements to perform specific operations, such as selecting one or more items for further processing.

In some embodiments, the attribute extraction computing device 4 may execute one or more models, processes, or algorithms, such as a machine learning model, deep learning model, statistical model, LLM, LLM ensemble model, etc., to extract one or more attributes from one or more elements included in a network catalog. The attribute extraction computing device 4 may transmit extracted attributes to the web server 6 over the communication network 22, and the web server 6 may utilize the extracted attributes to select interface elements for inclusion on the website to the user. For example, the web server 6 may display interface elements associated with recommended elements or items selected from a network catalog based on one or more extracted attributes to the user on a homepage, a catalog webpage, an item webpage, a window or interface of a chatbot, a search results webpage, or a post-transaction webpage of the website (e.g., as the user browses those respective webpages).

In some embodiments, a user submits an interface request on a website hosted by the web server 6. The web server 6 may implement a recommendation process to generate one or more elements for inclusion on the requested interface. The recommendation process may utilize element attributes that are extracted in real-time and/or prior to execution of the recommendation process to generate the one or more elements. Attribute extraction may be performed by the attribute extraction computing device 4. Extracted attributes may be provided directly to the web server 6 for use in a recommendation process and/or may be stored in a data store accessible by the web server 6.

The attribute extraction computing device 4 is further operable to communicate with the database 14 over the communication network 22. For example, the attribute extraction computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the attribute extraction computing device 4, in some embodiments, the database 14 may be a local storage device, such as a hard drive, a non-volatile memory, or a USB stick. The attribute extraction computing device 4 may store interaction data received from the web server 6 in the database 14. The attribute extraction computing device 4 may also receive from the web server 6 user session data identifying events associated with browsing sessions, and may store the user session data in the database 14.

In some embodiments, the attribute extraction computing device 4 generates data for a tuning and/or generating an LLM ensemble model including one or more LLMs for inclusion in the LLM ensemble model. The attribute extraction computing device 4 and/or one or more of the processing devices 10 may train one or more models based on corresponding training data. The attribute extraction computing device 4 may store the models in a database, such as in the database 14 (e.g., a cloud storage database).

The models, when executed by the attribute extraction computing device 4, allow the attribute extraction computing device 4 to optimally extract attribute labels from one or more data sources including unstructured and/or noisy data sources. For example, the attribute extraction computing device 4 may obtain one or more models from the database 14. The attribute extraction computing device 4 may then receive, in real-time and/or as batch data, datasets including one or more attributes and/or attribute values for extraction. In response to receiving the datasets, the attribute extraction computing device 4 may execute one or more LLM ensemble models to output final ensemble predictions for each of a set of attributes extracted from the datasets.

In some embodiments, the attribute extraction computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, attribute extraction computing device 4 may update catalog of the corresponding attributes and/or may provide extracted attribute values for use in one or more additional processes, such as one or more recommendation processes.

Figure 2:
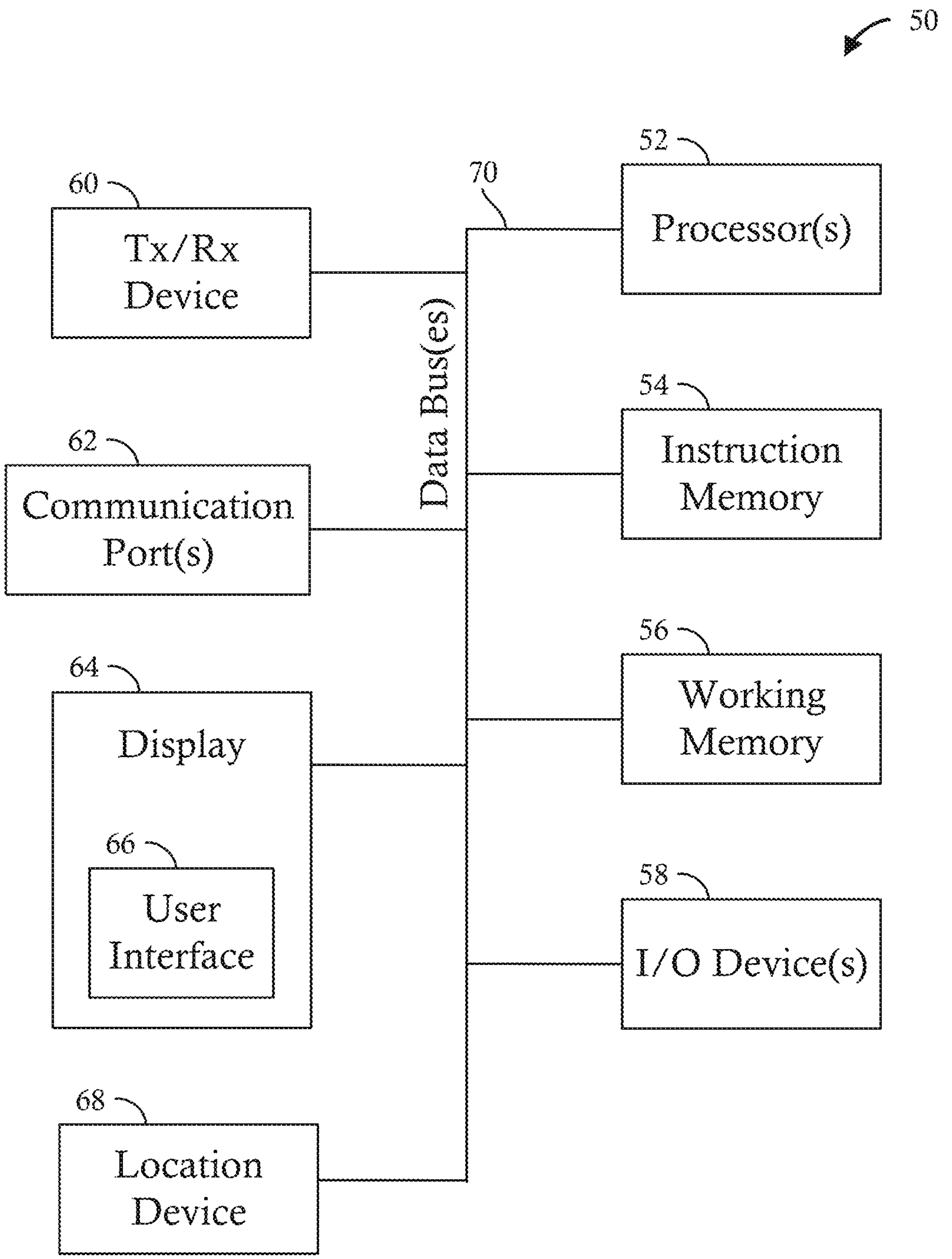
FIG. 2 illustrates a computer system configured to implement one or more processes, in accordance with some embodiments.

FIG. 2 illustrates a block diagram of a computing device 50, in accordance with some embodiments. In some embodiments, each of the attribute extraction computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for generating LLM ensemble models and performing attribute extraction using LLM ensemble models, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, Fire Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interfaces 66 may enable user interaction with interfaces including recommended items generated based on LLM ensemble model labeled attributes. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
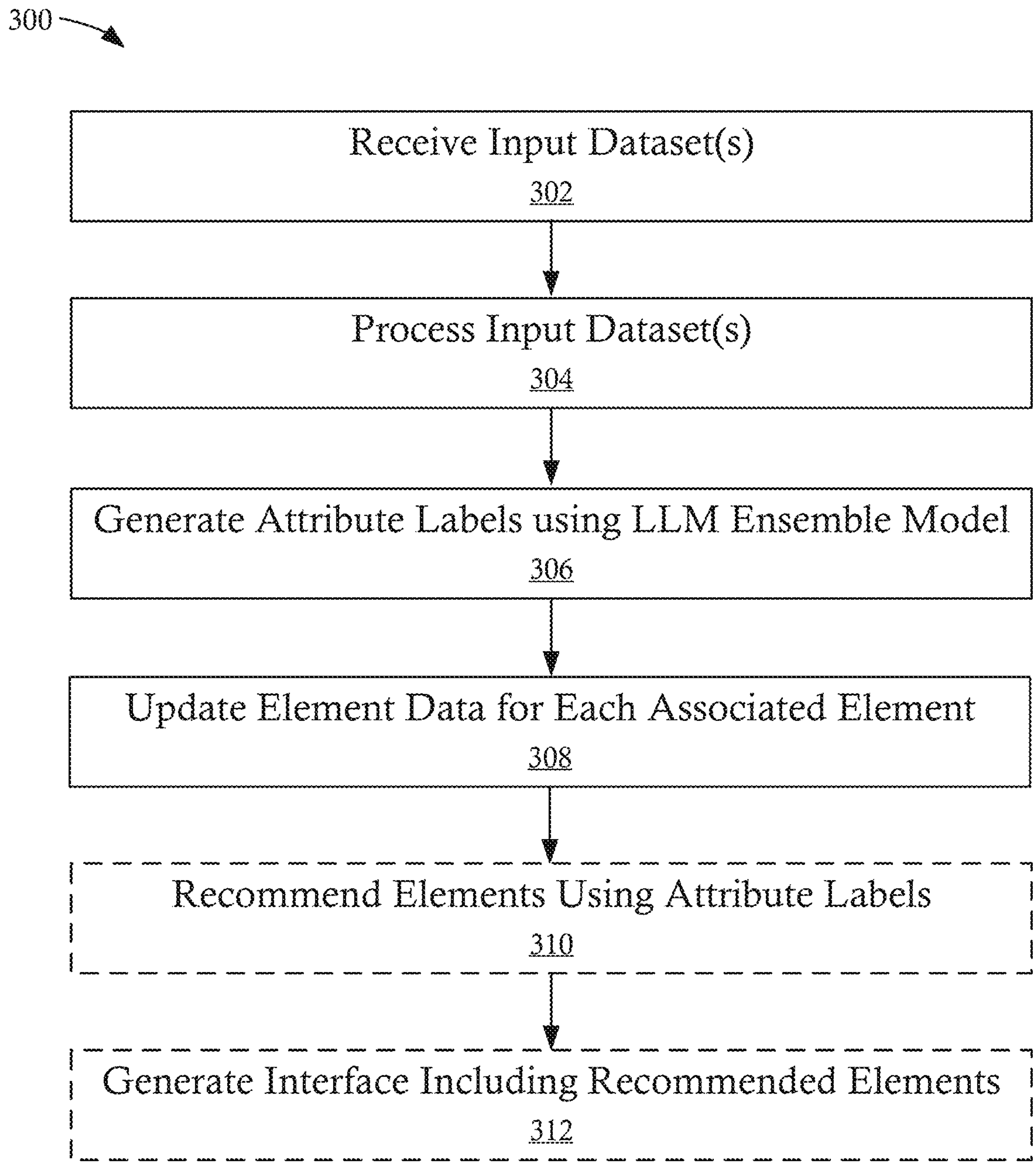
FIG. 3 is a flowchart illustrating an attribute extraction method using an LLM ensemble, in accordance with some embodiments.
Figure 4:
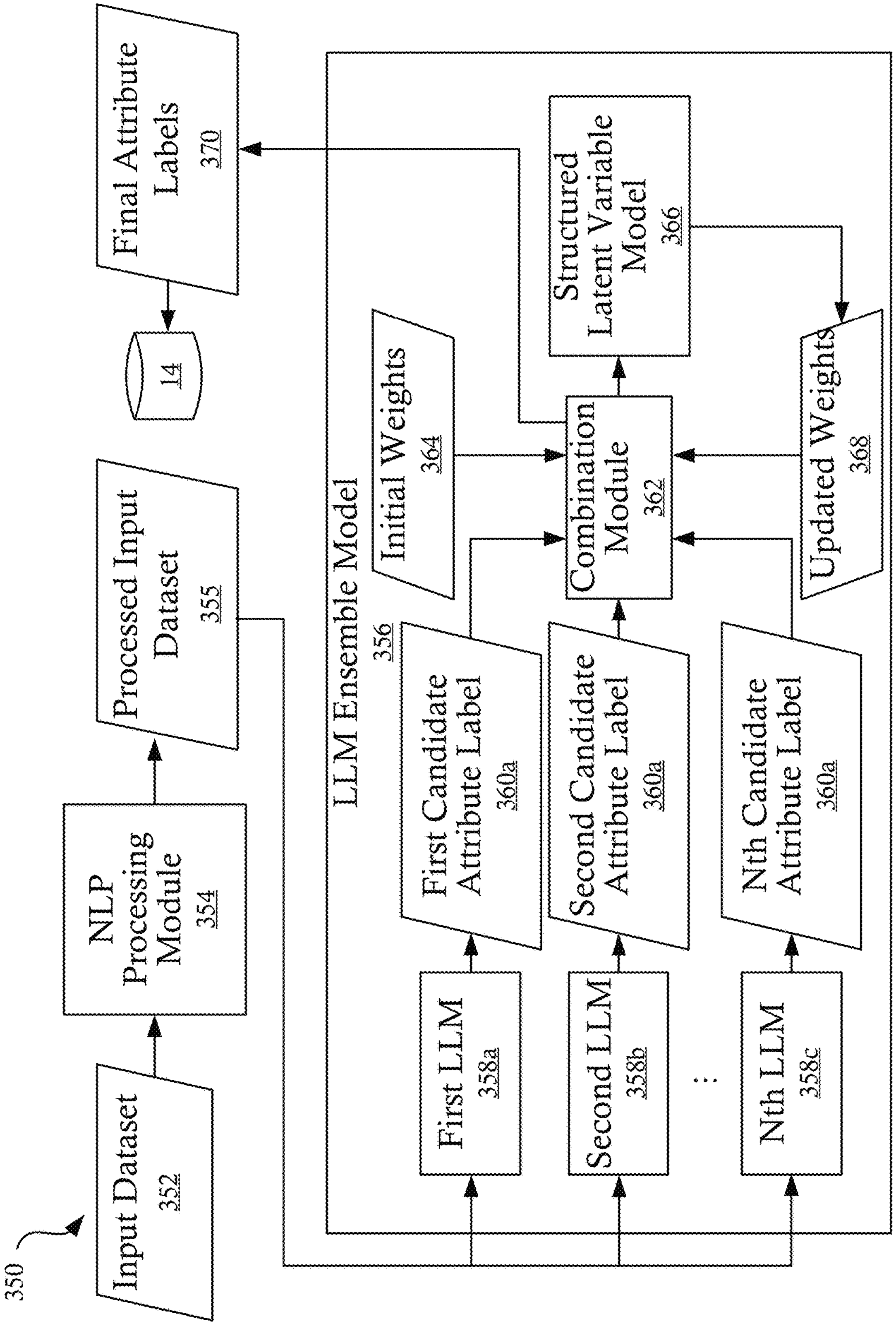
FIG. 4 is a process flow illustrating various steps of the attribute extraction method of FIG. 3, in accordance with some embodiments.

FIG. 3 is a flowchart illustrating an attribute extraction method 300, in accordance with some embodiments. FIG. 4 is a process flow 350 illustrating various steps of the attribute extraction method 300, in accordance with some embodiments. The attribute extraction method 300 may be implemented by any suitable system, device, engine, module, etc., such as the attribute extraction computing device 4 and/or the one or more processing devices 10 discussed above. The attribute extraction method 300 provides a theoretically optimal, computationally efficient, and securely deployable process for generating attribute labels from datasets including noisy and/or unstructured data.

At step 302, at least one input dataset 352 is received. The input dataset(s) 352 include one or more sources of data related to one or more elements associated with a network environment. For example, input dataset(s) 352 may include sources of catalog data related to elements stored in and/or associated with a network catalog. In the context of an e-commerce network environment, the input dataset(s) 352 may include item catalog data representative of items associated with an e-commerce catalog. The input dataset(s) 352 may include data representative of and/or related to one or attributes. For example, input dataset(s) 352 may include element data such as title, type, description, image, etc. Although specific embodiments are discussed herein, it will be appreciated that the input dataset(s) 352 may include any suitable input data suitable for use in attribute extraction by an LLM ensemble model 354, as discussed in greater detail below.

At step 304, the input dataset(s) 352 may be processed using one or more natural language processing (NLP) techniques to prepare the input dataset 352 for processing. The applied NLP techniques may be configured to arrange the input dataset(s) 352 into one or more known formats, such as, for example, one or more prompts configured to be provided to one or more LLMs. An NLP processing module 354 may be configured to apply one or more NLP techniques to tag, arrange, and/or modify words, terms, and phrases included in the input dataset 352, generate one or more processed input datasets 355 for one or more LLMs 358*a*-358*c* (collectively "LLMs 358"), and/or otherwise prepare an input dataset 352 for processing by one or more LLMs 358*a*-358*c*. For example, the NLP techniques may include, but are not limited to, tokenization, stemming and/or lemmatization, stop words removal, term frequency and inverse document frequency (TF-IDF), keyword extraction, embedding generation, sentiment analysis, topic modelling, text summarization, named entity recognition, etc. In some embodiments, NLP techniques are applied to format the input dataset 352 into an optimal prompt for one or more target LLMs 358*a*-358*c* included in an LLM ensemble model 356.

In some embodiments, the processed input dataset 355 includes one or more prompts configured to be received by one or more LLMS 358*a*-358*c*. For example, a prompt may include one or more configuration statements, one or more definitions, one or more output requirements, and/or any other suitable constraints or instructions for configuring an LLM 358*a*-358*c* to generate an attribute label output. The processed input dataset 355 may include a single prompt to be received by two or more of the LLMs 358 and/or may include LLM-specific prompts configured to be received by a specific one of the LLMs 358. It will be appreciated that any suitable configuration statements may be included within a prompt.

At step 306, attribute labels 370 are generated by an LLM ensemble model 356. The LLM ensemble model 356 includes two or more LLMs 358. Each of the LLMs 358 is configured to generate a candidate label 360 for one or more attributes based on the input dataset 352. In some embodiments, each of the LLMs 358 is configured to receive an input, such as a prompt input and/or processed dataset, from the NLP processing module 354, and generate a corresponding candidate attribute label 360. The LLMs may be configured, for example via the received prompt, to identify one or more attribute values for each corresponding element included in an input dataset 352. Target attributes may be identified via a received prompt and/or may be predefined during generation of the LLM ensemble model 356.

The LLM ensemble model 356 is configured to combine the candidate attribute labels 360 generated by each of the individual LLMs 358 to generate final attribute labels 370. In some embodiments, the LLM ensemble model 356 includes a combination module 362 configured to apply a weighted combination of candidate attribute labels 360 to generate the final attribute labels 370. The weighted combination may include any suitable weighted combination, such as a weighted majority voting combination. A majority voting combination generates the final attribute label 370 for a given attribute by selecting the attribute label assigned by a majority of the individual LLMs 358. Weighted majority voting applies weighting values to each of the candidate attribute labels 360 (i.e., the LLM outputs) such that labels assigned by one or more LLMs 358 are given greater weight/influence as compared to labels assigned by one or more other LLMs 358.

In some embodiments, the combination module 362 is configured to utilize a set of initial weights 364 for a weighted majority voting process and apply one or more refinement or update processes to adjust the applied weights to generate a consensus output, e.g., to generate final attribute labels 370. For example, a structured latent variable model 366 (e.g., a Dawid-Skene Model) may be applied to update weights 368 corresponding to one or more of the LLMs 358. A Dawid-Skene Model generates a maximum likelihood estimate for one or more parameters, such as candidate attribute labels 360 and/or combined attribute labels generated by the LLM ensemble model 356. The structure latent variable model 366 may iteratively refine one or more weights 368 prior to and/or concurrently with execution of the LLM ensemble model 356 to generate the final attribute labels 370. In some embodiments, the structure latent variable model 366 refines one or more applied weights 368 iteratively until the weights converge and the final attribute labels 370 are generated as a weighted combination utilizing the convergent weights. In some embodiments, the use of a Dawid-Skene structure latent variable model provides a theoretically optimal maximum likelihood determination of a theoretically optimal LLM ensemble model 356.

At step 308, element data associated with each of the elements represented in the input dataset 352 is updated to include corresponding attribute labels from the set of final attribute labels 370 generated by the LLM ensemble model 358. For example, a batch update process may be configured to update data structures representative of catalog elements to include corresponding attribute values included in the set of final attribute labels 370. Although specific embodiments are discussed herein, it will be appreciated that any suitable process may be utilized to apply generated final attribute labels 370 to the corresponding elements, e.g., catalog elements, related to the respective final attribute labels 370. The data elements may be stored in any suitable storage mechanism, such as, for example, a database 14.

At optional steps 310 and 312, the attribute labels, for example as applied to the corresponding element data structures at step 308, may be used to recommend elements for inclusion in a generated interface, as discussed in greater detail below. In one non-limiting example, an interface request is received. The interface request may include any suitable request, such as a network page request generated by one or more interactions via a user device with a network interface provided by a network environment. The interface request may include a user identifier, session data, and/or any other suitable data to be used for interface generation.

As one non-limiting example, an attribute extraction method 300 may be applied to generate attributes for catalog items included in an associated e-commerce catalog. The attribute extraction method 300 may be configured to extract attribute labels for one or more attributes of one or more products represented in the catalog items. For example, an input dataset representative of catalog items within a predetermined category (e.g., clothing) may be provided at step 302 of the attribute extraction method 300 and a prompt defining one or more category-related attributes (e.g., clothing-related attributes) may be defined at step 304. Clothing-related attributes may include, but are not limited to, age attributes (e.g., infant, child, teen, adult, etc.), gender attributes (e.g., men, women, unisex, etc.), color, size, etc.

The disclosed attribute extraction method 300 (and systems and methods incorporating it therein) provides an optimized attribute extraction process for uncertain and/or unstructured data sources, such as network catalog data. The disclosed systems and methods provide an automated, end-to-end pipeline to perform optimal attribute extraction. The disclosed systems and methods generate high quality and high accuracy attribute labels for use in additional processes, as discussed below. Further, the disclosed attribute extraction method 300 provides the theoretically optimal LLM ensemble model and extraction process for attribute extraction.

At step 310, a set of recommended elements are generated for inclusion in the generated interface. The set of recommended elements may be generated by any suitable recommendation process. For example, one or more sets of recommended items may be generated by a similar item recommendation process, a complete the look recommendation process, an out of stock substitution process, a complementary recommendation process, and/or any other suitable recommendation process. In some embodiments, one or more recommendation processes may utilize one or more attributes of catalog elements to generate the set of recommended elements. The recommendation processes may utilize attribute labels previously and/or concurrently applied by implementation of the attribute extraction method 300.

At step 312, an interface including the set of recommended elements is generated and provided to a user device that generated the interface request. The interface may be provided as a set of instructions configured to cause the user device to generate the interface and to obtain one or more assets, such as the set of recommended elements, from one or more network accessible data stores.

Figure 5:
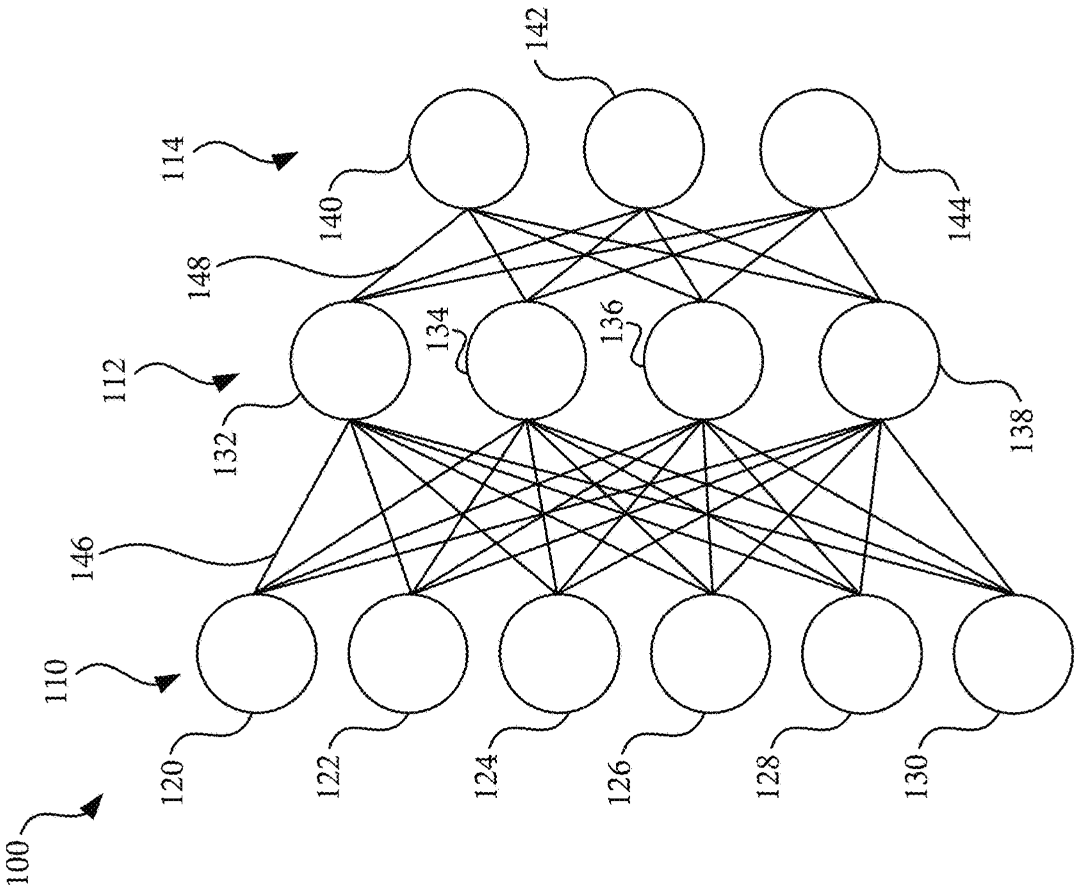
FIG. 5 illustrates an artificial neural network, in accordance with some embodiments.

FIG. 5 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 5 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 may be arranged in layers 110-114, wherein the layers may comprise an intrinsic order introduced by the edges 146-148 between the nodes 120-144 such that edges 146-148 exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 may be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number may be assigned as a value to every node 120-144 of the neural network 100. Here, $$x_i^{(n)}$$

denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 may comprise a weight being a real number, in particular, the weight is a real number within the interval [−1, 1], within the interval [0, 1], and/or within any other suitable interval. Here, $$w_{i,j}^{(m,n)}$$

denotes the weight of the edge between the i-th node 120-138 of the m-th layer 110, 112 and the j-th node 132-144 of, the n-th layer 112, 114. Furthermore, the abbreviation $$w_{i,j}^{(n)}$$

is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 may be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 may be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w'^{(n)}_{i,j} = w_{i,j}^{(n)} - \gamma \cdot \delta_j^{(n)} \cdot x_i^{(n)}$$

wherein $\gamma$ is a learning rate, and the numbers $$\delta_j^{(n)}$$

may be recursively calculated as $$\delta_j^{(n)} = \left(\sum\nolimits_k \delta_k^{(n+1)} \cdot w_{j,k}^{(n+1)}\right) \cdot f'\left(\sum\nolimits_i x_i^{(n)} \cdot w_{i,j}^{(n)}\right)$$

based on $$\delta_j^{(n+1)},$$

if the (n+1)-th layer is not the output layer, and $$\delta_j^{(n)} = \left(x_k^{(n+1)} - t_j^{(n+1)}\right) \cdot f'\left(\sum\nolimits_i x_i^{(n)} \cdot w_{i,j}^{(n)}\right)$$

if the (n+1)-th layer is the output layer 114, wherein f' is the first derivative of the activation function, and $$y_j^{(n+1)}$$

is the comparison training value for the j-th node of the output layer 114.

Figure 6:
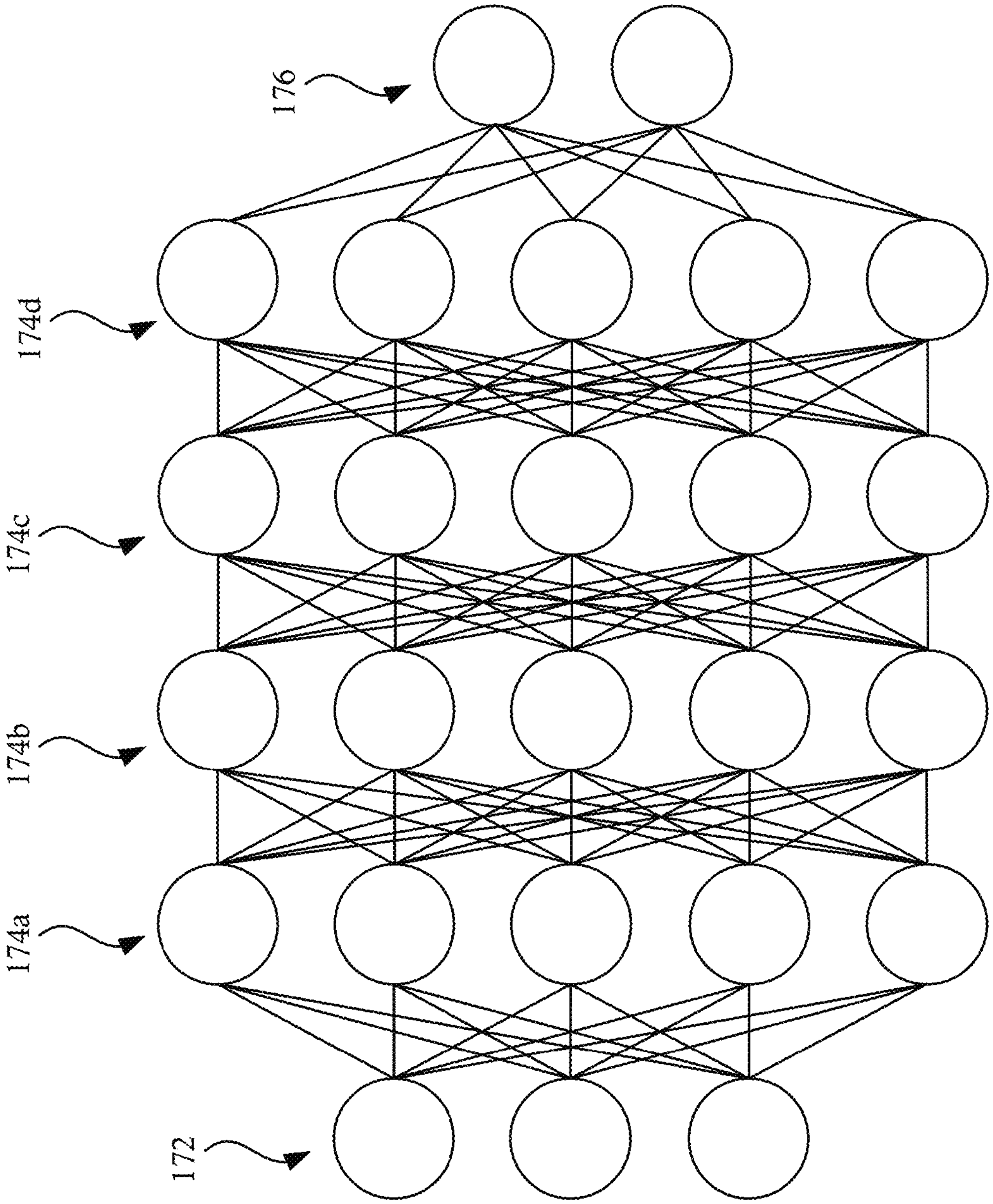
FIG. 6 illustrates a deep neural network (DNN), in accordance with some embodiments.

FIG. 6 illustrates a deep neural network (DNN) 170, in accordance with some embodiments. The DNN 170 is an artificial neural network, such as the neural network 100 illustrated in conjunction with FIG. 5, that includes representation learning. The DNN 170 may include an unbounded number of (e.g., two or more) intermediate layers 174*a*-174*d* each of a bounded size (e.g., having a predetermined number of nodes), providing for practical application and optimized implementation of a universal classifier. Each of the layers 174*a*-174*d* may be heterogenous. The DNN 170 may be configured to model complex, non-linear relationships. Intermediate layers, such as intermediate layer 174*c*, may provide compositions of features from lower layers, such as layers 174*a*, 174*b*, providing for modeling of complex data.

In some embodiments, the DNN 170 may be considered a stacked neural network including multiple layers each configured to execute one or more computations. The computation for a network with L hidden layers may be denoted as:

$$f(i) = f\left[a^{(L+1)}\left(h^{(L)}\left(a^{(L)}\left(\ldots\left(h^{(2)}\left(a^{(2)}\left(h^{(1)}\left(a^{(1)}(x)\right)\right)\right)\right)\right)\right)\right)\right]$$

where $a^{(l)}(x)$ is a preactivation function and $h^{(l)}(x)$ is a hidden-layer activation function providing the output of each hidden layer. The preactivation function $a^{(l)}(x)$ may include a linear operation with matrix $W^{(l)}$ and bias $b^{(l)}$, where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 may include a backpropagation network in which the output of at least one hidden layer is provided, e.g., propagated, to a prior hidden layer. The DNN 170 may include any suitable neural network, such as a self-organizing neural network, a recurrent neural network, a convolutional neural network, a modular neural network, and/or any other suitable neural network.

In some embodiments, a DNN 170 may include a neural additive model (NAM). An NAM includes a linear combination of networks, each of which attends to (e.g., provides a calculation regarding) a single input feature. For example, a NAM may be represented as:

$$y = \beta + f_1(x_1) + f_2(x_2) + \ldots + f_K(x_K)$$

where $\beta$ is an offset and each $f_i$ is parametrized by a neural network. In some embodiments, the DNN 170 may include a neural multiplicative model (NMM), including a multiplicative form for the NAM mode using a log transformation of the dependent variable y and the independent variable x:

$$y = e^{\beta} e^{f(\log x)} e^{\sum_i f_i^d(d_i)}$$

where d represents one or more features of the independent variable x.

Identification of related interface elements associated with catalog elements can be burdensome and time consuming for users, especially if attribute labels assigned to catalog elements are incorrect (e.g., noisy, incomplete, etc.). Typically, a user may locate information regarding related catalog elements by navigating a browse structure, sometimes referred to as a "browse tree," in which interface pages or elements are arranged in a predetermined hierarchy. Such browse trees typically include multiple hierarchical levels, requiring users to navigate through several levels of browse nodes or pages to arrive at an interface page of interest. Thus, the user frequently has to perform numerous navigational steps to arrive at a page containing information regarding related catalog elements.

Systems including attribute extraction via an LLM ensemble model, as disclosed herein, significantly reduce this problem, allowing users to locate related catalog elements with fewer, or in some case no, active steps. For example, in some embodiments described herein, when a user is presented with an interface including recommended catalog elements, each interface element includes, or is in the form of, a link to an interface page, for example, related to the catalog element. Each recommendation thus serves as a programmatically selected navigational shortcut to an interface page, allowing a user to bypass the navigational structure of the browse tree. Beneficially, programmatically identifying and extracting attribute values via an LLM ensemble model and presenting a user with navigations shortcuts to catalog elements identified based on the improved attribute values may improve the speed of the user's navigation through an electronic interface, rather than requiring the user to page through multiple other pages in order to locate the related catalog elements via the browse tree or via a search function. This may be particularly beneficial for computing devices with small screens, where fewer interface elements are displayed to a user at a time and thus navigation of larger volumes of data is more difficult.

It will be appreciated that automated extraction of attributes via an LLM ensemble model as disclosed herein, particularly on large datasets intended to be used large network environment such as e-commerce environments, is only possible with the aid of computer-assisted machine-learning algorithms and techniques, such as LLMs and/or structured latent variable models. In some embodiments, machine learning processes including LLMs and/or structure latent variable models are used to perform operations that cannot practically be performed by a human, either mentally or with assistance, such as attribute extraction from noisy and unstructured datasets via an LLM ensemble method.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:

a processor; and a non-transitory memory, storing instructions that, when executed, cause the processor to:

receive an input dataset;

generate a plurality of preliminary attribute labels for at least a first attribute of a first element in the input dataset, wherein each preliminary attribute label in the plurality of preliminary attribute labels is generated by one of a plurality of large language models (LLM);

apply an iterative refinement process to a plurality of initial weights and the plurality of preliminary attribute labels that converges the plurality of initial weights to generate a plurality of refined weights, wherein each of the plurality of initial weights corresponds to one of the plurality of large language models;

apply each of the plurality of refined weights to a corresponding one of the preliminary attribute labels to generate a weighted plurality of preliminary attribute labels;

generate a final attribute label for the first attribute based on a combination of the weighted plurality of preliminary attribute labels for the first attribute; and update a data structure representative of the first element to include the final attribute label for the first attribute.

2. The system of claim 1, wherein, prior to generating the final attribute label, the instructions cause the processor to:

apply a first set of weights to the plurality of preliminary attribute labels, wherein the first set of weights includes at least one LLM specific weight for each preliminary attribute label of the plurality of preliminary attribute labels;

receive an updated set of weights; and apply the updated set of weights to the plurality of preliminary attribute labels during the combination of the weighted plurality of preliminary attribute labels.

3. The system of claim 1, wherein the combination of the weighted plurality of preliminary attribute labels comprises:

assigning a first weight to a first preliminary attribute label of the plurality of preliminary attribute labels generated by a first LLM; and assigning a second weight to a second preliminary attribute label of the plurality of preliminary attribute labels generated by a second LLM.

4. The system of claim 3, wherein determining the combination of the weighted plurality of preliminary attribute labels is an iterative process that optimizes the combination of weights for each LLM of the plurality of LLMs.

5. The system of claim 1, wherein the instructions further cause the processor to generate at least one element to be displayed at a user interface, wherein the at least one element is determined based on the final attribute label stored in the data structure.

6. The system of claim 1, wherein each respective preliminary attribute label is identified by a received prompt.

7. The system of claim 1, wherein each respective preliminary attribute label is predefined during generation each LLM of the plurality of LLMs.

8. A computer-implemented method, comprising:

receiving an input dataset;

generating a plurality of preliminary attribute labels for at least a first attribute of a first element in the input dataset, wherein each preliminary attribute label in the plurality of preliminary attribute labels is generated by one of a plurality of large language models (LLM);

applying an iterative refinement process to a plurality of initial weights and the plurality of preliminary attribute labels that converges the plurality of initial weights to generate a plurality of refined weights, wherein each of the plurality of initial weights corresponds to one of the plurality of large language models;

applying each of the plurality of refined weights to a corresponding one of the preliminary attribute labels to generate a weighted plurality of preliminary attribute labels;

generating a final attribute label for the first attribute based on a combination of the weighted plurality of preliminary attribute labels for the first attribute; and updating a data structure representative of the first element to include the final attribute label for the first attribute.

9. The computer-implemented method of claim 8, wherein, prior to generating the final attribute label, the method further includes:

applying a first set of weights to the plurality of preliminary attribute labels, wherein the first set of weights includes at least one LLM specific weight for each preliminary attribute label of the plurality preliminary attribute labels;

receiving an updated set of weights; and applying the updated set of weights to the plurality of preliminary attribute labels during the combination of the weighted plurality of preliminary attribute labels.

10. The computer-implemented method of claim 8, wherein the combination of the weighted plurality of preliminary attribute labels comprises:

assigning a first weight to a first preliminary attribute label of the plurality of preliminary attribute labels generated by a first LLM; and assigning a second weight to a second preliminary attribute label of the plurality of preliminary attribute labels generated by a second LLM.

11. The computer-implemented method of claim 10, wherein determining the combination of the weighted plurality of preliminary attribute labels is an iterative process that optimizes the combination of weights for each LLM of the plurality of LLMs.

12. The computer-implemented method of claim 8, wherein the method further includes generating at least one element to be displayed at a user interface, wherein the at least one element is determined based on the final attribute label stored in the data structure.

13. The computer-implemented method of claim 8, wherein each respective preliminary attribute label is identified by a received prompt.

14. The computer-implemented method of claim 8, wherein each respective preliminary attribute label is predefined during generation each LLM of the plurality of LLMs.

15. A non-transitory computer readable medium having instructions stored thereon, wherein the instructions, when executed by at least one processor, cause at least one device to perform operations comprising:

receiving an input dataset;

generating a plurality of preliminary attribute labels for at least a first attribute of a first element in the input dataset, wherein each preliminary attribute label in the plurality of preliminary attribute labels is generated by one of a plurality of large language models (LLM);

applying an iterative refinement process to a plurality of initial weights and the plurality of preliminary attribute labels that converges the plurality of initial weights to generate a plurality of refined weights, wherein each of the plurality of initial weights corresponds to one of the plurality of large language models;

applying each of the plurality of refined weights to a corresponding one of the preliminary attribute labels to generate a weighted plurality of preliminary attribute labels;

generating a final attribute label for the first attribute based on a combination of the weighted plurality of preliminary attribute labels for the first attribute; and updating a data structure representative of the first element to include the final attribute label for the first attribute.

16. The non-transitory computer readable medium of claim 15, wherein, prior to generating the final attribute label, the instructions cause the at least one device to perform operations comprising:

applying a first set of weights to the plurality of preliminary attribute labels, wherein the first set of weights includes at least one LLM specific weight for each preliminary attribute label of the plurality preliminary attribute labels;

receiving an updated set of weights; and applying the updated set of weights to the plurality of preliminary attribute labels during the combination of the weighted plurality of preliminary attribute labels.

17. The non-transitory computer readable medium of claim 15, wherein the combination of the weighted plurality of preliminary attribute labels comprises:

assigning a first weight to a first preliminary attribute label of the plurality of preliminary attribute labels generated by a first LLM; and assigning a second weight to a second preliminary attribute label of the plurality of preliminary attribute labels generated by a second LLM.

18. The non-transitory computer readable medium of claim 17, wherein determining the combination of the weighted plurality of preliminary attribute labels is an iterative process that optimizes the combination of weights for each LLM of the plurality of LLMs.

19. The non-transitory computer readable medium of claim 15, wherein the instructions further cause the at least one device to perform operations comprising:

generating at least one element to be displayed at a user interface, wherein the at least one element is determined based on the final attribute label stored in the data structure.

20. The non-transitory computer readable medium of claim 15, wherein each respective preliminary attribute label is identified by a received prompt.

* * * * *